United States Patent
Arai et al.

(10) Patent No.: US 9,872,294 B2
(45) Date of Patent: Jan. 16, 2018

(54) BASE STATION, RADIO COMMUNICATIONS SYSTEM, AND PROCESSING METHOD IN BASE STATION

(71) Applicant: FUJITSU LIMITED, Kawasaki-shi, Kanagawa (JP)

(72) Inventors: Hiroaki Arai, Kawasaki (JP); Tsuyoshi Hasegawa, Kawasaki (JP); Tokuro Kubo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 15/078,762

(22) Filed: Mar. 23, 2016

(65) Prior Publication Data
US 2016/0295590 A1    Oct. 6, 2016

(30) Foreign Application Priority Data
Apr. 1, 2015    (JP) .................................. 2015-075434

(51) Int. Cl.
*H04W 72/04*    (2009.01)
*H04W 72/08*    (2009.01)

(52) U.S. Cl.
CPC ...... *H04W 72/0453* (2013.01); *H04W 72/042* (2013.01); *H04W 72/085* (2013.01)

(58) Field of Classification Search
CPC ........... H04W 72/042; H04W 72/0453; H04W 72/085
See application file for complete search history.

(56) References Cited

U.S. PATENT DOCUMENTS 6,140,961 A * 10/2000 Takai ................... H01Q 3/2605
                                                            342/367
6,201,795 B1 * 3/2001 Baum ................... H04W 16/14
                                                            370/230

(Continued)

FOREIGN PATENT DOCUMENTS

JP    2003-332960    11/2003
JP    2013-526135    6/2013
WO    2011126266    10/2011

OTHER PUBLICATIONS

Kawai, et al., "Independent Adaptive Control of Surviving Symbol Replica Candidates at Each Stage Based on Minimum Branch Metric in QRM-MLD for OFCDM MIMO multiplexing", IEEE VTC2004-Fall. vol. 3, pp. 1558-1564 (7pages).

*Primary Examiner* — Dung B Huynh
(74) *Attorney, Agent, or Firm* — Fujitsu Patent Center

(57) ABSTRACT

A base station includes a determining unit, and a change unit. The determining unit determines, for each terminal, whether reception quality of an uplink signal from the terminal is equal to or smaller than a certain threshold. The change unit performs first processing or second processing when the reception quality is equal to or smaller than the certain threshold. The first processing is the processing of instructing a first terminal, a terminal of a transmission source of an uplink signal, to change the frequency of the uplink signal of the first terminal to the frequency of either an uplink or a downlink signal assigned to each terminal. The second processing is the processing of changing the frequency of a downlink signal identical to that of the uplink signal from the first terminal to the frequency of either an uplink or a downlink signal assigned to each terminal.

13 Claims, 12 Drawing Sheets

(56) References Cited

U.S. PATENT DOCUMENTS

| | | | |
|---|---|---|---|
| 2002/0160813 A1* | 10/2002 | Miya | H04W 72/0453 455/561 |
| 2003/0060169 A1* | 3/2003 | Takano | H04W 16/28 455/69 |
| 2003/0134654 A1* | 7/2003 | Masuda | H04W 52/40 455/522 |
| 2004/0185893 A1* | 9/2004 | Doi | H01Q 1/246 455/525 |
| 2005/0255891 A1 | 11/2005 | Takai | |
| 2005/0266799 A1* | 12/2005 | Hara | H04B 7/0617 455/63.4 |
| 2006/0092877 A1* | 5/2006 | Niemela | H04L 5/26 370/330 |
| 2006/0292994 A1* | 12/2006 | Oura | H04B 7/0617 455/67.16 |
| 2008/0117871 A1* | 5/2008 | Olexa | H04B 7/12 370/329 |
| 2010/0246507 A1* | 9/2010 | Dan | H04L 5/0044 370/329 |
| 2011/0141998 A1* | 6/2011 | Nishio | H04W 72/042 370/329 |
| 2011/0243040 A1 | 10/2011 | Khan et al. | |
| 2011/0249657 A1* | 10/2011 | Kishiyama | H04J 11/0069 370/336 |
| 2011/0317595 A1* | 12/2011 | Kanda | H04B 7/0408 370/277 |
| 2012/0083278 A1* | 4/2012 | Kazmi | H04W 36/06 455/440 |
| 2012/0299774 A1* | 11/2012 | Oyama | G01S 3/20 342/372 |
| 2013/0188624 A1* | 7/2013 | Lee | H04W 24/02 370/338 |
| 2013/0222182 A1* | 8/2013 | Nakasato | H04L 27/2613 342/368 |
| 2013/0301601 A1* | 11/2013 | Takano | H04B 7/0634 370/329 |
| 2013/0308437 A1* | 11/2013 | Hayakawa | H04W 24/04 370/216 |
| 2014/0286176 A1* | 9/2014 | Ro | H04W 24/04 370/242 |
| 2016/0150516 A1* | 5/2016 | Ando | H04L 5/0032 455/452.1 |
| 2016/0206289 A1* | 7/2016 | Yamamoto | A61B 8/0841 |
| 2017/0141826 A1* | 5/2017 | Kim | H04B 7/0486 |

* cited by examiner

FIG.3

| TERMINAL ID | UPLINK SIGNAL FREQUENCY | DOWNLINK SIGNAL FREQUENCY | DIRECTION |
|---|---|---|---|
| M001 | $f_2$ | $f_1$ | $d_1$ |
| M002 | $f_1$ | $f_2$ | $d_2$ |
| M003 | $f_4$ | $f_3$ | $d_3$ |
| ⋮ | ⋮ | ⋮ | ⋮ |

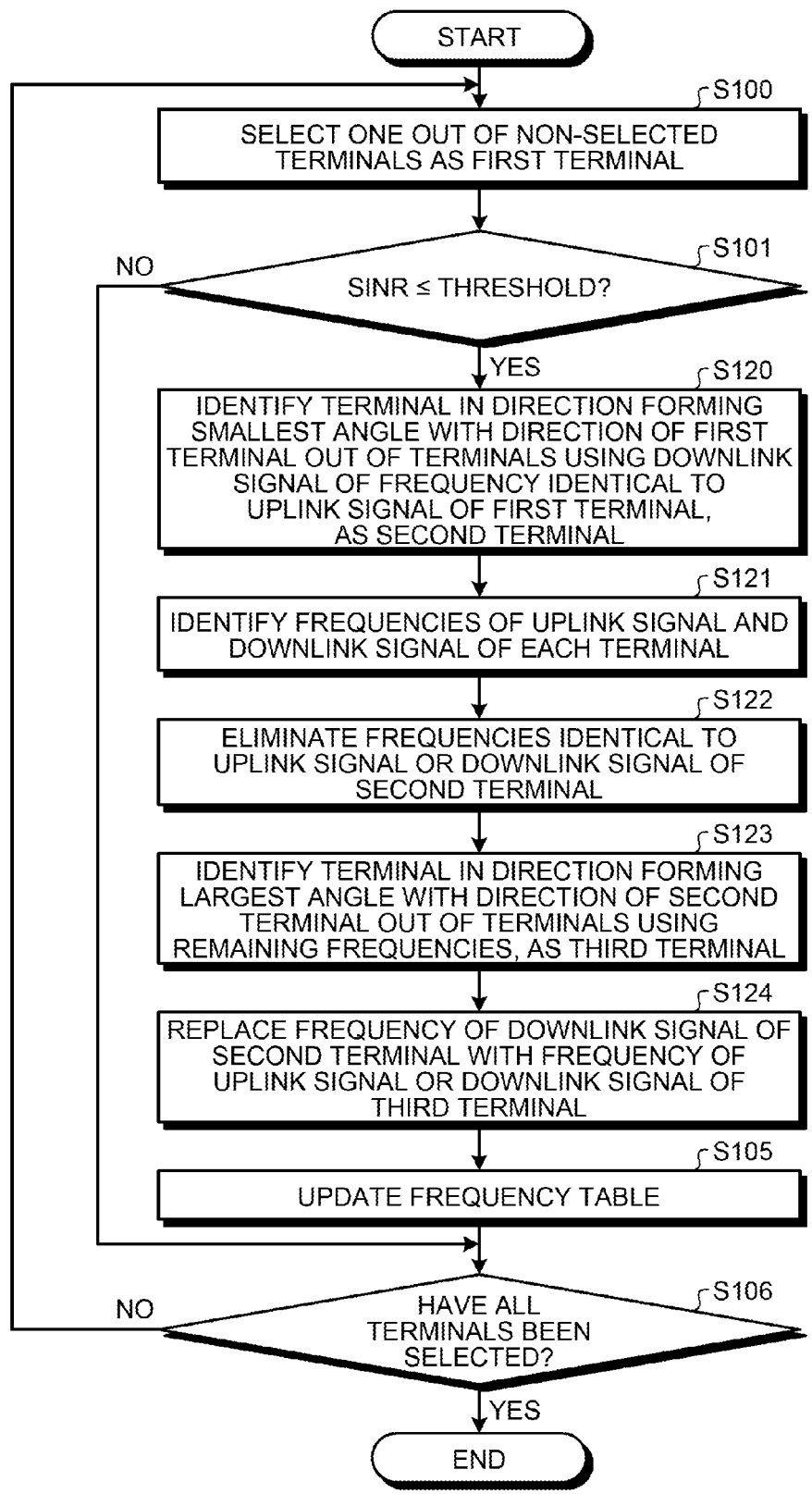

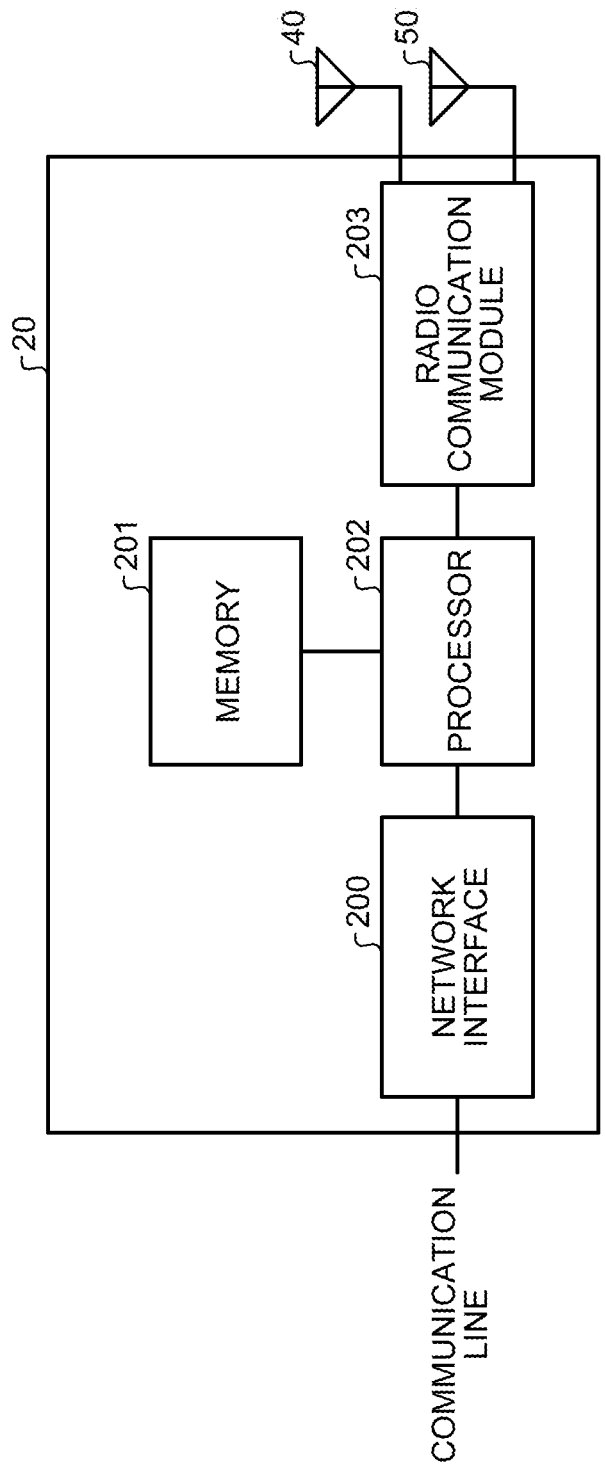

BASE STATION, RADIO COMMUNICATIONS SYSTEM, AND PROCESSING METHOD IN BASE STATION

CROSS-REFERENCE TO RELATED APPLICATION(S)

This application is based upon and claims the benefit of priority of the prior Japanese Patent Application No. 2015-075434, filed on Apr. 1, 2015, the entire contents of which are incorporated herein by reference.

FIELD

The embodiments discussed herein are related to a base station, a radio communications system, and a processing method in a base station.

BACKGROUND

Full duplex communication that simultaneously performs transmission and reception by using an identical frequency has been known. In full duplex communication, because the transmission and the reception are performed at the same time, self-interference in which the transmission signal of itself transmitted from a transmitting antenna sneaks into a receiving antenna of itself and results in an interference signal of the receiving signal occurs, and thereby the quality of the receiving signal is deteriorated. Consequently, the processing of cancelling the sneaking transmission signal by subtracting the transmission signal, which is output from a power amplifier, from the signal that is input into the receiving antenna is performed.

Furthermore, to suppress the self-interference, known has been a technology that controls the directivity of the transmitting antenna and the directivity of the receiving antenna so as not to spatially overlap with each other. Related-art examples are described in Japanese National Publication of International Patent Application No. 2013-526135, and in non-patent literature of H. Kawai, et al., "Independent Adaptive Control of Surviving Symbol Replica Candidates at Each Stage Based on Minimum Branch Metric in QRM-MLD for OFCDM MIMO Multiplexing," IEEE VTC2004-Fall. Vol. 3, P 1558-1564.

Meanwhile, the transmission signal transmitted from the transmitting antenna may be reflected by an external obstacle and be input to the receiving antenna. Even when the directivity of the transmitting antenna and the directivity of the receiving antenna are controlled so as not to spatially overlap with each other, depending on the placement of the obstacle, the transmission signal transmitted from the transmitting antenna may be reflected by the obstacle and be input to the receiving antenna.

The signal that directly arrives at the receiving antenna from the transmitting antenna can be cancelled, based on the amount of attenuation and that of delay corresponding to the distance between the transmitting antenna and the receiving antenna, by subtracting the signal from a transmitting unit from the signal received by the receiving antenna. However, on the transmission signal that is reflected by the external obstacle and arrived at the receiving antenna, because the distance to the obstacle is unknown, the amount of attenuation and that of delay of the reflected waves that are input to the receiving antenna are unknown. Thus, in order to cancel the reflected waves by using the output from the power amplifier, a large scale circuit that performs the processing of estimating the reception strength and the delay of the reflected waves included in the received signal is to be provided. This makes the downsizing of the communication apparatus difficult.

SUMMARY

According to an aspect of an embodiment, a base station capable of simultaneously receiving an uplink signal from a terminal and transmitting a downlink signal to a terminal by using an identical frequency, the base station includes a transmitting unit, a receiving unit, a determining unit, and a change unit. The transmitting unit transmits, for each terminal, a downlink signal at a frequency assigned to the terminal via an antenna having directivity in a direction of the terminal. The receiving unit receives, for each terminal, an uplink signal at a frequency assigned to the terminal via an antenna having directivity in a direction of the terminal. The determining unit that determines, for each terminal, whether reception quality of the uplink signal from the terminal, due to reflected waves of a downlink signal, is equal to or smaller than a certain threshold. When the determining unit determines that the reception quality is equal to or smaller than the certain threshold, the change unit instructs a first terminal that is a terminal of a transmission source of an uplink signal to change the frequency of the uplink signal of the first terminal to either the frequency of an uplink signal or the frequency of a downlink signal assigned to each terminal, or changes the frequency of a downlink signal identical to the frequency of the uplink signal from the first terminal to either the frequency of an uplink signal or the frequency of a downlink signal assigned to each terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table illustrating one example of a frequency table;

FIG. 11 is a flowchart illustrating one example of the operation of a base station in the third embodiment; and FIG. 12 is a block diagram illustrating one example of hardware of the base station.

DESCRIPTION OF EMBODIMENTS

Preferred embodiments of the present invention will be explained with reference to accompanying drawings. The following embodiments, however, are not intended to limit the disclosing technology. The respective embodiments can be combined appropriately within a range of not making the processing details inconsistent.

[a] First Embodiment

Radio Communications System 10

Figure 1:
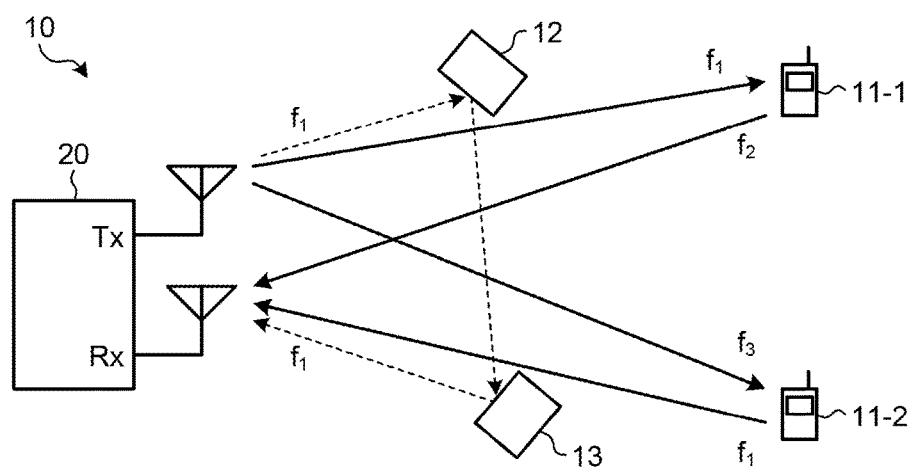
FIG. 1 is a diagram illustrating one example of a radio communications system according to a first embodiment.

FIG. 1 is a diagram illustrating one example of a radio communications system 10 according to a first embodiment. The radio communications system 10 in the first embodiment includes a base station 20 and a plurality of terminals 11 (terminals 11-1 and 11-2). In the following description, when each of the terminal 11-1 and the terminal 11-2 is generically described without being distinguished, it is described as the terminal 11. In FIG. 1, the radio communications system 10 that has two pieces of the terminals 11-1 and 11-2 is illustrated. However, the radio communications system 10 may have three or more pieces of the terminals 11.

The base station 20 is capable of simultaneously receiving an uplink signal from any of the terminals 11 and transmitting a downlink signal to any of the terminals 11, by using an identical frequency. That is, the base station 20 is capable of performing full duplex communication. The base station 20 forms, by using an array antenna and the like, a transmitting beam and a receiving beam of radio waves for each of the terminals 11. Consequently, even when the base station 20 transmits downlink signals to a plurality of terminals 11 by using an identical frequency, each of the terminals 11 can receive the signal addressed to itself distinguishing the signals addressed to other terminals 11. Furthermore, even when each of the terminals 11 transmits an uplink signal to the base station 20 at the same time by using an identical frequency, the base station 20 can distinguish and receive the signals from the respective terminals 11.

The base station 20 is capable of arbitrarily assigning, out of the frequencies corresponding to the predetermined number of channels, the frequencies of downlink signals to the terminals 11, and the frequencies of uplink signals from the terminals 11. In an example illustrated in FIG. 1, a frequency $f_1$ is assigned to the downlink signal for the terminal 11-1, a frequency $f_2$ is assigned to the uplink signal from the terminal 11-1, a frequency $f_3$ is assigned to the downlink signal for the terminal 11-2, and the frequency $f_1$ is assigned to the uplink signal from the terminal 11-2. The base station 20 illustrated in FIG. 1 simultaneously performs the transmission of the downlink signal using the frequency $f_1$ for the terminal 11-1 and the reception of the uplink signal using the frequency $f_1$ for the terminal 11-2.

Each of the terminals 11 receives a downlink signal from the base station 20 by using the frequency instructed from the base station 20. Furthermore, each of the terminals 11 transmits an uplink signal to the base station 20 by using the frequency instructed from the base station 20. Each of the terminals 11 need not have a function of performing full duplex communication.

For example, as illustrated in FIG. 1, as the terminal 11 or an obstacle moves, the downlink signal transmitted to the terminal 11-1 from the base station 20 by using the frequency $f_1$ may be reflected by an obstacle 12 and an obstacle 13 and arrive at the base station 20 from the direction of the terminal 11-2. In that case, the reflected waves reflected by the obstacle 12 and the obstacle 13 are received by the base station 20 as interference waves of the uplink signal transmitted from the terminal 11-2 by using the frequency $f_1$. The power of the downlink signal transmitted from the base station 20 is greater than that of the uplink signal transmitted from the terminal 11-2. Thus, the reception quality of the uplink signal transmitted from the terminal 11-2 is deteriorated in the base station 20, and the uplink signal transmitted from the terminal 11-2 is not demodulated correctly by the base station 20 in some cases.

To avoid this, the base station 20 in the first embodiment makes the terminal 11-2 change the frequency of the uplink signal when the quality of the uplink signal transmitted from the terminal 11-2 is deteriorated by the reflected waves. Consequently, the base station 20 can receive the uplink signal from the terminal 11-2 at a frequency different from that of the reflected waves. Thus, the base station 20 can easily separate the reflected waves from the uplink signal from the terminal 11-2, and thereby improve the reception quality of the uplink signal from the terminal 11-2.

Base Station 20

Figure 2:
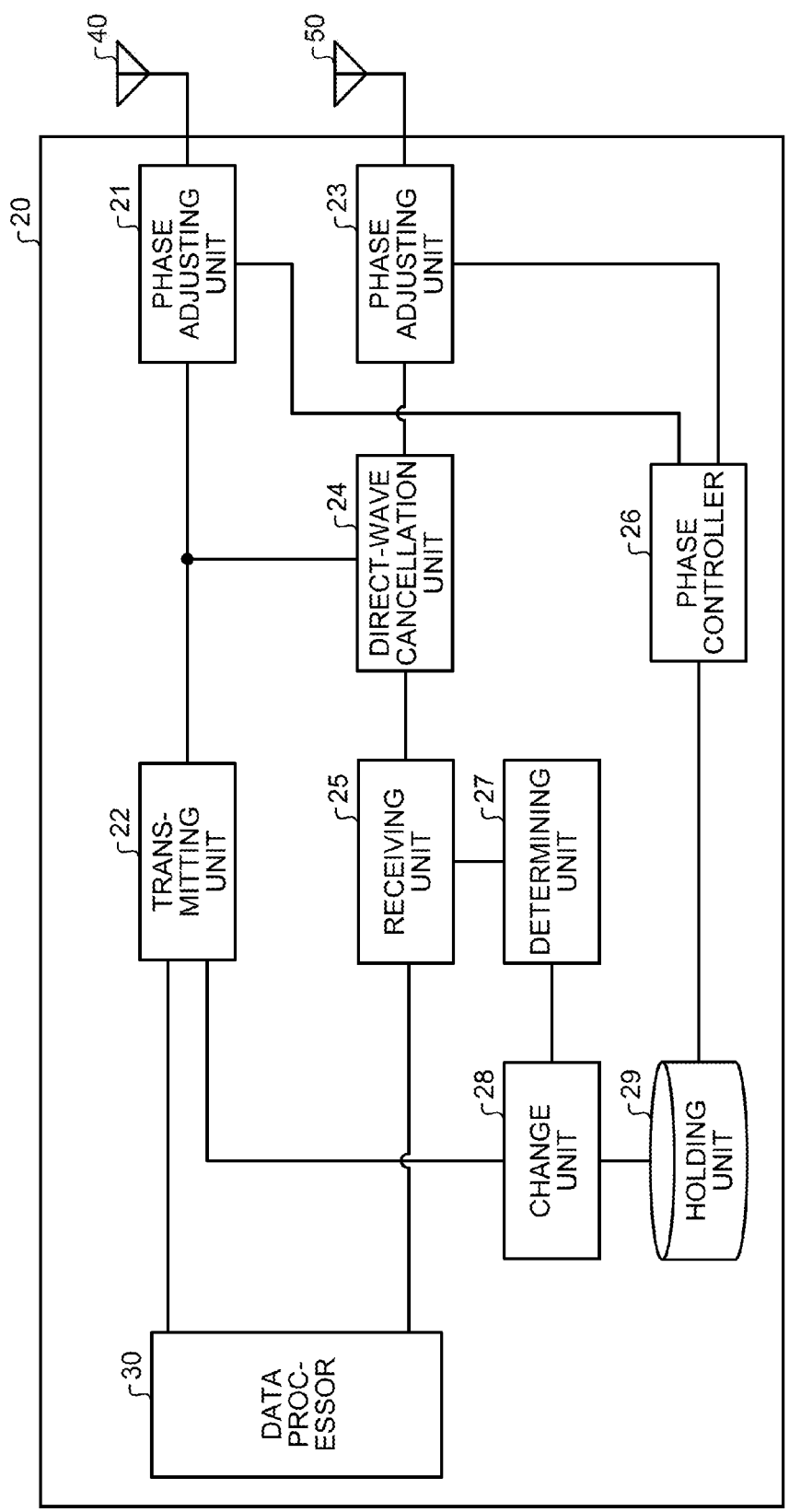
FIG. 2 is a block diagram illustrating one example of a base station.

FIG. 2 is a block diagram illustrating one example of the base station 20. To the base station 20, a transmitting antenna 40 and a receiving antenna 50 are connected. In the first embodiment, the transmitting antenna 40 and the receiving antenna 50 are array antennas that include a plurality of antenna elements. The base station 20 includes a phase adjusting unit 21, a transmitting unit 22, a phase adjusting unit 23, a direct-wave cancellation unit 24, a receiving unit 25, a phase controller 26, a determining unit 27, a change unit 28, a holding unit 29, and a data processor 30.

The holding unit 29 holds therein a frequency table 290 such as the one illustrated in FIG. 3, for example. FIG. 3 is a table illustrating one example of the frequency table 290. In the frequency table 290, being associated with a terminal ID 291 that identifies each of the terminals 11, an uplink signal frequency 292, a downlink signal frequency 293, and a direction 294 are stored.

The uplink signal frequency 292 represents the frequency of an uplink signal that is assigned to the terminal 11 identified by the terminal ID 291. The downlink signal frequency 293 represents the frequency of a downlink signal that is assigned to the terminal 11 identified by the terminal ID 291. The direction 294 represents the direction toward the terminal 11 identified by the terminal ID 291, from the base station 20.

The phase adjusting unit 21 adjusts the phases of downlink signals input to the respective antenna elements in the transmitting antenna 40, in accordance with a control signal from the phase controller 26, and thereby forms a transmitting beam of the downlink signal for each terminal 11. The phase adjusting unit 21 then transmits the downlink signal output from the transmitting unit 22 for each terminal 11 by using the transmitting beam formed in the direction of the terminal 11.

Figure 4:
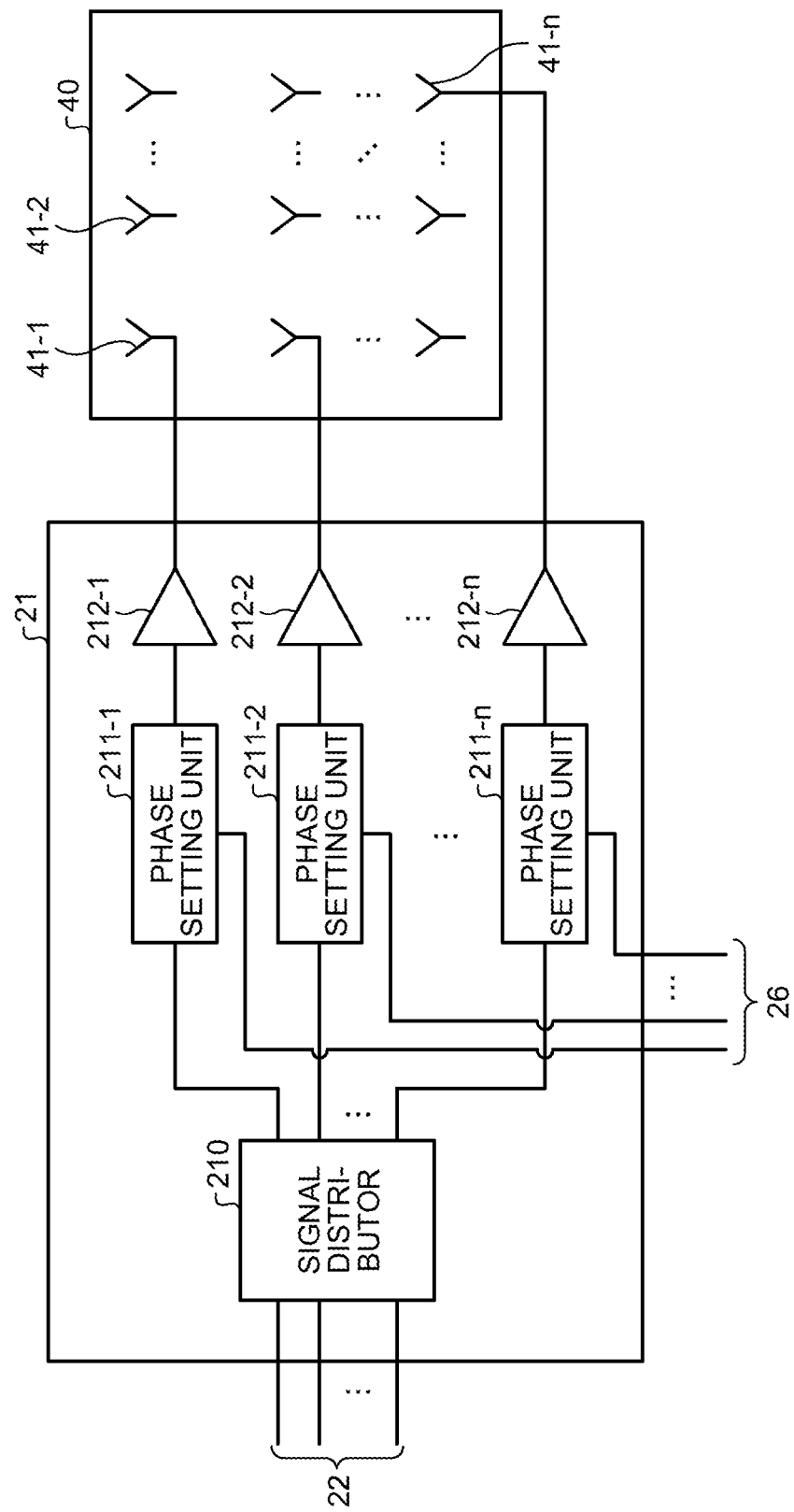
FIG. 4 is a block diagram illustrating one example of a transmitting antenna and a phase adjusting unit.

FIG. 4 is a block diagram illustrating one example of the transmitting antenna 40 and the phase adjusting unit 21. The phase adjusting unit 21 includes a signal distributor 210, a plurality of phase setting units 211-1 to 211-$n$, and a plurality of high power amplifiers (HPAs) 212-1 to 212-$n$. The transmitting antenna 40 includes a plurality of antenna elements 41-1 to 41-$n$. In the following description, when each of the phase setting units 211-1 to 211-$n$ is generically described without being distinguished, it is described as a phase setting unit 211. When each of the HPAs 212-1 to 212-*n* is generically described without being distinguished, it is described as a HPA 212. When each of the antenna elements 41-1 to 41-*n* is generically described without being distinguished, it is described as an antenna element 41.

The signal distributor 210 distributes, for each terminal 11, the downlink signal output from the transmitting unit 22 to the phase setting units 211 that are assigned to the terminal 11. Each of the phase setting units 211 sets the phase of the downlink signal, which has been distributed from the signal distributor 210, to the phase corresponding to a control signal output from the phase controller 26. Each of the HPAs 212 amplifies the downlink signal on which the phase has been set by the phase setting unit 211. The downlink signals that have been amplified by the respective HPAs 212 are transmitted from the respective antenna elements 41.

In the first embodiment, a certain number of the phase setting units 211, the HPAs 212, and the antenna elements 41 are assigned to each of the terminals 11, and a transmitting beam of the downlink signal is formed by these phase setting units 211, HPAs 212, and antenna elements 41, for the terminal 11, for example.

The phase adjusting unit 23 adjusts the phases of uplink signals received via the respective antenna elements in the receiving antenna 50, and thereby forms, for each terminal 11, a receiving beam for which the reception gain of radio waves from the direction of the terminal 11 has been increased. The phase adjusting unit 23 then outputs, for each terminal 11, the uplink signal received by using the receiving beam of the direction of the terminal 11 to the direct-wave cancellation unit 24.

Figure 5:
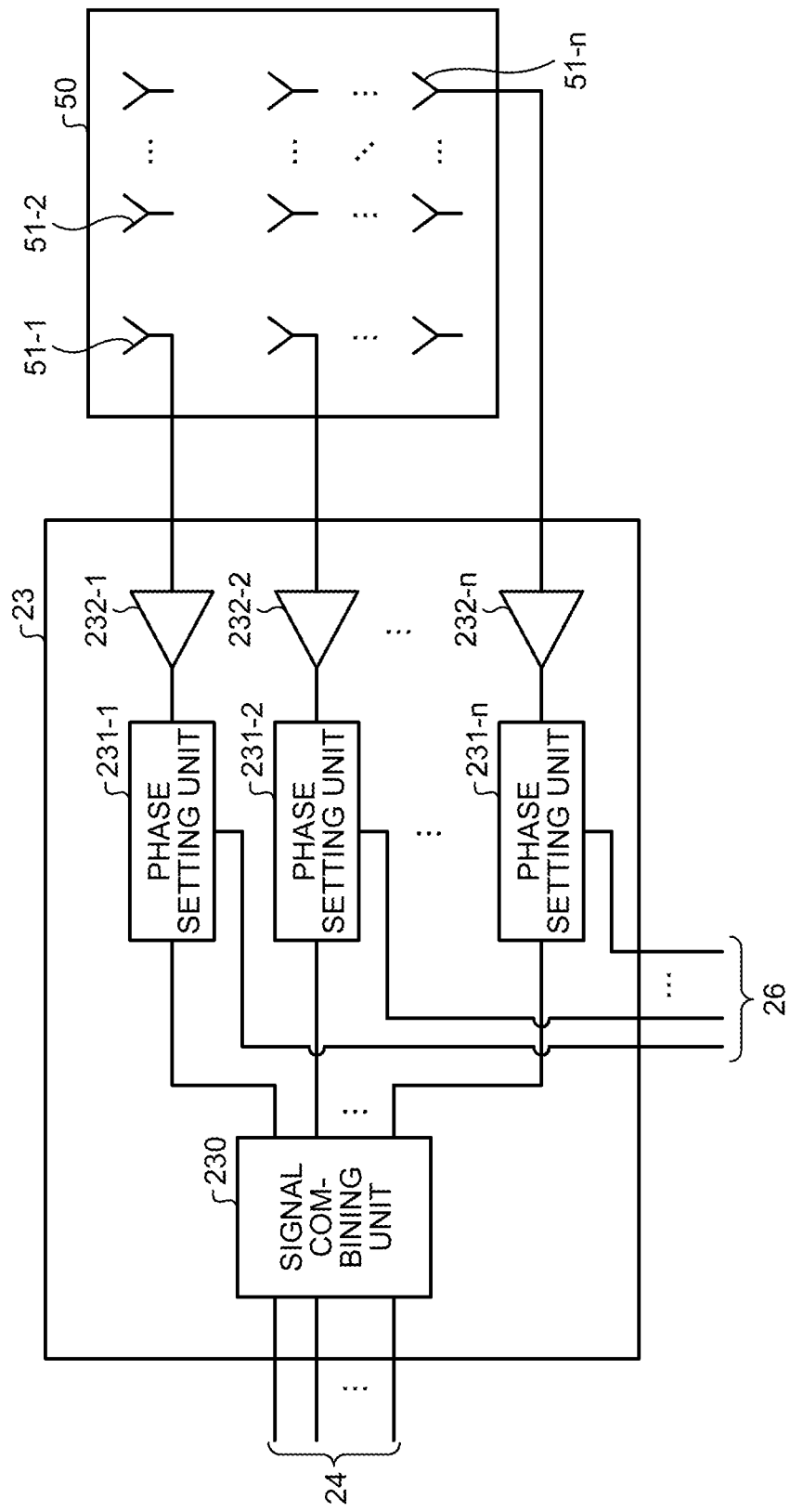
FIG. 5 is a block diagram illustrating one example of a receiving antenna and a phase adjusting unit.

FIG. 5 is a block diagram illustrating one example of the receiving antenna 50 and the phase adjusting unit 23. The phase adjusting unit 23 includes a signal combining unit 230, a plurality of phase setting units 231-1 to 231-*n*, and a plurality of low-noise amplifiers (LNAs) 232-1 to 232-*n*. The receiving antenna 50 includes a plurality of antenna elements 51-1 to 51-*n*. In the following description, when each of the phase setting units 231-1 to 231-*n* is generically described without being distinguished, it is described as a phase setting unit 231. When each of the LNAs 232-1 to 232-*n* is generically described without being distinguished, it is described as a LNA 232. When each of the antenna elements 51-1 to 51-*n* is generically described without being distinguished, it is described as an antenna element 51.

Each of the LNAs 232 amplifies the uplink signal that has been received by the antenna element 51. Each of the phase setting units 231 sets the phase of the uplink signal, which has been amplified by the LNA 232, to the phase corresponding to the control signal output from the phase controller 26. The signal combining unit 230 combines, for each terminal 11, the uplink signals for which the phase setting units 231 have set the phase. The signal combining unit 230 then outputs the combined uplink signals to the direct-wave cancellation unit 24, for each terminal 11.

In the first embodiment, a certain number of the phase setting units 231, the LNAs 232, and the antenna elements 51 are assigned to each of the terminals 11, and a receiving beam of uplink signals is formed by these phase setting units 231, LNAs 232, and antenna elements 51, for the terminal 11, for example.

The phase controller 26, for each terminal 11, changes the phase of the downlink signal that is input to each of the antenna elements 41 in the transmitting antenna 40 slightly, and thereby changes the direction of the transmitting beam slightly. The phase controller 26 then determines one after another, based on the reception strength of the downlink signal notified by the terminal 11, the direction of the transmitting beam in which the reception strength of the downlink signal becomes greater in the terminal 11.

Furthermore, the phase controller 26, for each terminal 11, changes the phase of the uplink signal that is output from each of the antenna elements 51 in the receiving antenna 50 slightly, and thereby changes the direction of the receiving beam slightly. The phase controller 26 then measures the reception strength of the uplink signal and determines one after another the direction of the receiving beam in which the reception strength of the uplink signal becomes greater.

The phase controller 26, for each terminal 11, identifies the direction of the terminal 11 based on the determined directions of the transmitting beam and the receiving beam and stores the information indicating the identified direction of the terminal 11, being associated with the terminal ID that identifies the terminal 11, into the frequency table 290 in the holding unit 29. In the first embodiment, the phase controller 26 identifies, as the direction of the terminal 11, an intermediate direction between the direction of the transmitting beam and the direction of the receiving beam, for example.

The transmitting unit 22 performs, for each terminal 11, the processing of encoding and modulation on data output from the data processor 30, and thereby generates a downlink signal. The transmitting unit 22 then up-converts the downlink signal generated for each terminal 11 into a downlink signal of the frequency assigned to the terminal 11, and outputs it to the phase adjusting unit 21.

The direct-wave cancellation unit 24, by using the amount of attenuation and that of delay predetermined based on the distance between the transmitting antenna 40 and the receiving antenna 50, subtracts the downlink signal that is output by the transmitting unit 22 from the uplink signal that is output by the phase adjusting unit 23. Consequently, the direct-wave cancellation unit 24 cancels the downlink signal that is directly input to the receiving antenna 50 from the transmitting antenna 40, from the uplink signal received by the receiving antenna 50. The direct-wave cancellation unit 24 outputs the uplink signal after the cancellation to the receiving unit 25.

The receiving unit 25 performs, for each terminal 11, the processing of down-conversion, demodulation, and others on the uplink signal output from the direct-wave cancellation unit 24, and outputs the uplink signal after the processing to the data processor 30. The receiving unit 25 further calculates, for each terminal 11, the reception quality of the uplink signal received from the terminal 11 and outputs a signal indicating the calculated reception quality to the determining unit 27. In the first embodiment, the receiving unit 25 calculates, for each terminal 11, a signal-to-interference plus noise power ratio (SINR) of the uplink signal received from the terminal 11 as the reception quality of the uplink signal received from the terminal 11.

Figure 6:
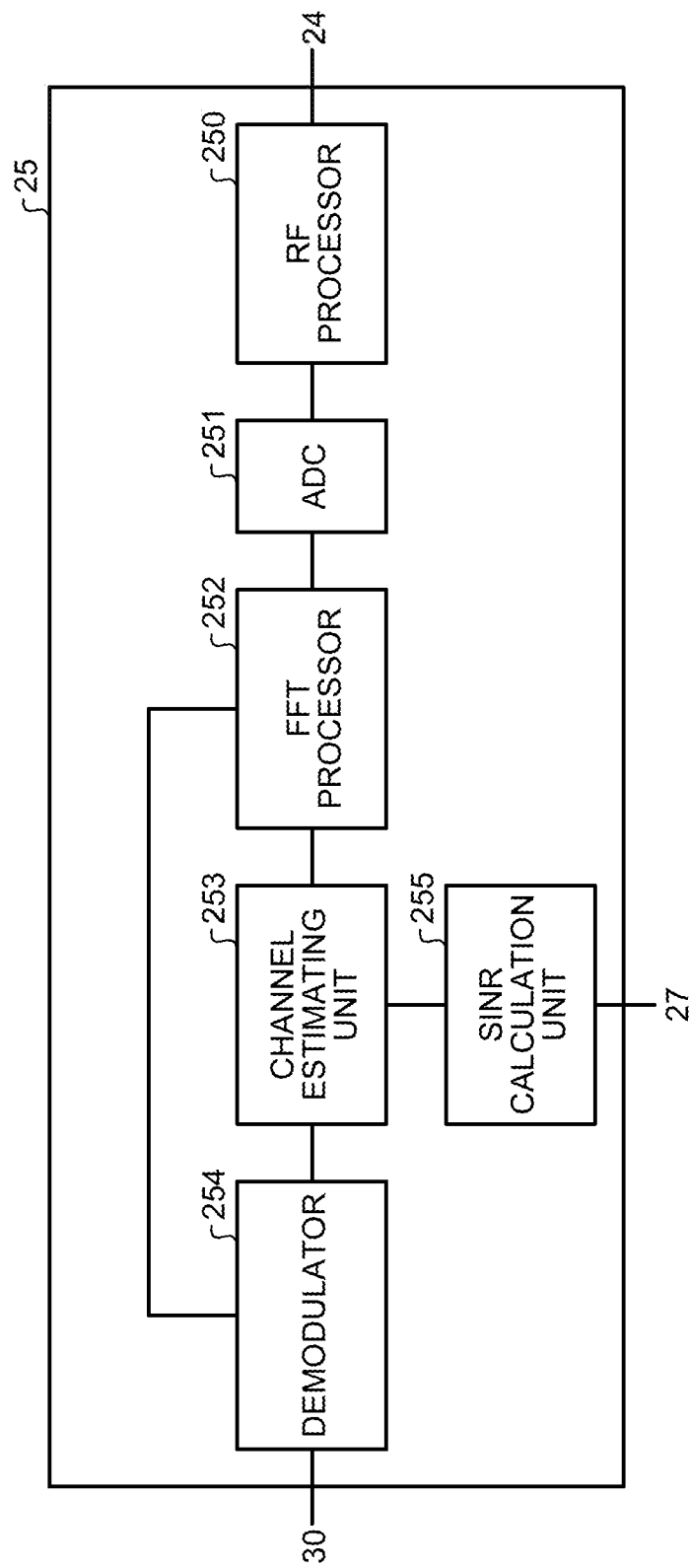
FIG. 6 is a block diagram illustrating one example of a receiving unit.

FIG. 6 is a block diagram illustrating one example of the receiving unit 25. The receiving unit 25 includes an RF processor 250, an analog-to-digital converter (ADC) 251, a fast Fourier transform (FFT) processor 252, a channel estimating unit 253, a demodulator 254, and an SINR calculation unit 255.

The RF processor 250 down-converts, for each terminal 11, the uplink signal output from the direct-wave cancellation unit 24 into a baseband signal. The ADC 251 converts the analog baseband signal, which has been down-converted by the RF processor 250, into a digital signal. The FFT processor 252 performs FFT processing on the uplink signal that has been converted into the digital signal by the ADC 251. The channel estimating unit 253 calculates a channel estimated value of a radio propagation path. The demodulator 254 demodulates, by using the channel estimated value estimated by the channel estimating unit 253, the uplink signal on which the FFT processing has been performed by the FFT processor 252. The demodulator 254 then outputs the uplink signal after the demodulation to the data processor 30.

The SINR calculation unit 255 calculates, for each terminal 11, the information indicating the reception quality of the uplink signal by using the channel estimated value calculated by the channel estimating unit 253. In the first embodiment, the SINR calculation unit 255 calculates, for each terminal 11, the SINR of the uplink signal as the information indicating the reception quality. In the radio communications system 10 in the first embodiment, the base station 20 and each of the terminals 11 perform communication by using orthogonal frequency-division multiplexing (OFDM). In the first embodiment, the uplink signal transmitted to the base station 20 from the terminal 11 includes a pilot signal such as a reference signal (RS).

The SINR calculation unit 255 calculates the interference noise power $\sigma(n)^2$ for each terminal 11 in accordance with the following Expression (1), for example.

$$\sigma(n)^2 = \frac{1}{K-2} \sum_{i=1}^{K-2} \left| h(n, Mi) - \frac{h(n, M(i-1)) + h(n, M(i+1))}{2} \right|^2 \quad (1)$$

The n represents a resonance element (RE) number when counted in a time direction. The K represents the number of RSs that are included in a frequency direction in the n row. The M represents the disposed interval of the RS.

Next, the SINR calculation unit 255 calculates the power S(n) of the uplink signal for each terminal 11 in accordance with the following Expression (2), for example.

$$S(n) = \left| \frac{1}{K} \sum_{i=1}^{K} h(n, Mi)^2 - \sigma(n)^2 \right| \quad (2)$$

Then, the SINR calculation unit 255 calculates the SINR for each terminal 11 in accordance with the following Expression (3), and outputs the calculated SINR to the determining unit 27.

$$SINR = \frac{S(n)}{\sigma(n)^2} \quad (3)$$

In the first embodiment, the SINR calculation unit 255 calculates the SINR for each terminal 11 at each predetermined timing, for example. The predetermined timing is the timing for each of a certain number of slots included in the uplink signal from the terminal 11, for example. The SINR calculation unit 255 may calculate the SINR for each terminal 11 at the timing of each slot included in the uplink signal from the terminal 11, for example.

The determining unit 27 determines, for each terminal 11, whether the reception quality of the uplink signal from the terminal 11, due to the reflected waves of the downlink signal, is equal to or smaller than a certain threshold. In the first embodiment, when the SINR calculated by the SINR calculation unit 255 is equal to or smaller than a certain value, the determining unit 27 determines, for each terminal 11, that the reception quality of the uplink signal from the terminal 11, due to the reflected waves of the downlink signal, is equal to or smaller than a certain threshold. When the terminal 11 for which the reception quality of the uplink signal from the terminal 11, due to the reflected waves of the downlink signal, is equal to or smaller than the certain threshold is detected, the determining unit 27 defines the detected terminal 11 as a first terminal 11 and outputs a terminal ID of the first terminal 11 to the change unit 28.

The change unit 28, when the terminal ID of the first terminal 11 is output from the determining unit 27, refers to the frequency table 290 in the holding unit 29 and identifies the frequencies assigned to the uplink signal or the downlink signal for each of the terminals 11. The change unit 28 then eliminates from the identified frequencies the frequencies assigned to the uplink signal and the downlink signal that are associated with the terminal ID of the first terminal 11. Then, the change unit 28 identifies any of the remaining frequencies as the frequency of the uplink signal of the first terminal 11.

The change unit 28 then rewrites with the identified frequency the uplink signal frequency stored in the frequency table 290 being associated with the terminal ID of the first terminal 11. The change unit 28 further instructs the transmitting unit 22 to change the frequency of the uplink signal of the first terminal 11 to the identified frequency. The transmitting unit 22 generates, for the first terminal 11, a downlink signal including a message that specifies changing of the frequency of the uplink signal to the frequency identified by the change unit 28. The transmitting unit 22 then transmits the generated downlink signal to the first terminal 11 via the phase adjusting unit 21.

In the example illustrated in FIG. 1, the determining unit 27 detects the reception quality of the uplink signal from the terminal 11-2, due to the reflected waves, being equal to or smaller than a certain threshold, and outputs a terminal ID of the terminal 11-2 to the change unit 28 as the terminal ID of the first terminal 11. The change unit 28 refers to the frequency table 290 in the holding unit 29 and identifies the frequencies $f_1$ to $f_3$ as the frequencies assigned to the uplink signal or the downlink signal for each of the terminals 11. The change unit 28 then eliminates from the identified frequencies the frequency $f_1$ of the uplink signal and the frequency $f_3$ of the downlink signal that are associated with the terminal ID of the first terminal 11. Consequently, as for the frequency identified by the change unit 28, the frequency $f_2$ remains.

Then, the change unit 28 identifies the remaining frequency $f_2$ as the frequency of the uplink signal of the terminal 11-2 that is the first terminal 11. The change unit 28 then rewrites with the frequency $f_2$ the frequency of the uplink signal being associated with the terminal ID of the terminal 11-2 in the frequency table 290. Then, the change unit 28 makes the terminal 11-2 change the frequency of the uplink signal to the frequency $f_2$. Thus, because the frequency of the uplink signal of the terminal 11-2 becomes a frequency different from the reflected waves, it is possible to reduce the influence of the reflected waves in the frequency band of the uplink signal of the terminal 11-2 and to improve the reception quality of the uplink signal from the terminal 11-2.

Even if each of the terminals 11 has the function of full duplex communication, when an identical frequency is assigned to the uplink signal and the downlink signal, the uplink signal transmitted from a terminal 11 may be reflected by an obstacle and received by the terminal 11.

Consequently, this may deteriorate the quality of the downlink signal received by the terminal 11. Thus, the change unit 28 in the first embodiment eliminates, out of the frequencies $f_1$ to $f_3$ assigned to the terminal 11-1 or the terminal 11-2, the frequency $f_3$ of the downlink signal that the first terminal 11 is using, in addition to the frequency $f_1$ of the uplink signal that the terminal 11-2 is using. Consequently, it is possible to avoid that the frequency identical to the downlink signal frequency $f_3$ of the terminal 11-2 is assigned to the terminal 11-2 as the uplink signal frequency.

In the first embodiment, the change unit 28 changes the frequency of the uplink signal for which the reception quality is deteriorated due to the reflected waves to the frequency selected out of the frequencies that have already been assigned to each of the terminals 11 as the frequencies of the uplink signal or the downlink signal. However, it is obvious that, when there is a frequency that is not yet assigned to any of the terminals 11 out of the frequencies available to the radio communications system 10, the change unit 28 may change the frequency of the uplink signal for which the reception quality is deteriorated due to the reflected waves to an unassigned frequency.

Operation of Base Station 20

Figure 7:
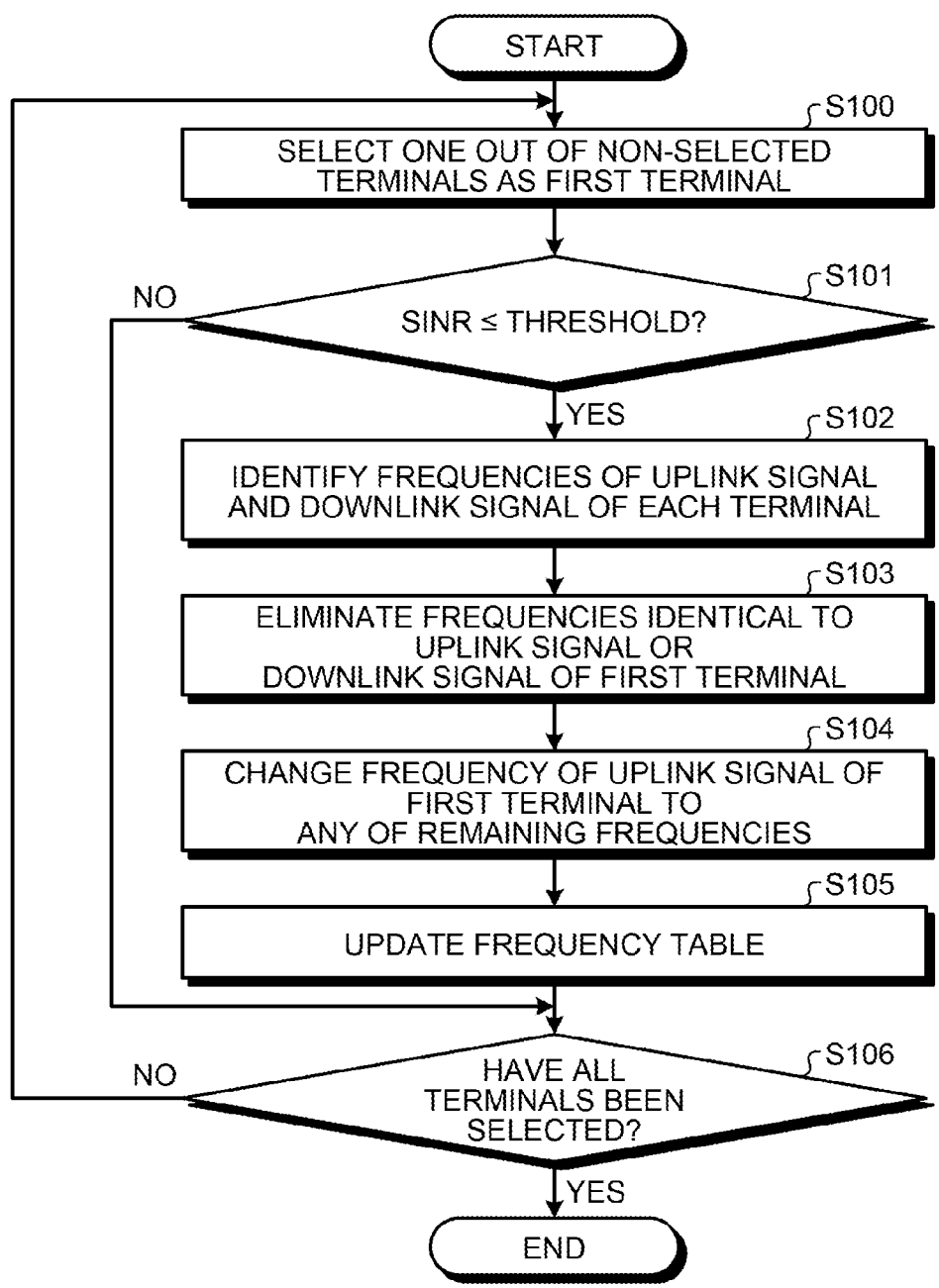
FIG. 7 is a flowchart illustrating one example of the operation of the base station in the first embodiment.

FIG. 7 is a flowchart illustrating one example of the operation of the base station 20 in the first embodiment. The base station 20 executes the operation illustrated in the flowchart at intervals of a few milliseconds to a few seconds, for example. The base station 20 performs, separately from the operation illustrated in the flowchart, the transmission of the downlink signal, the reception of the uplink signal, and the calculation of the SINR of the uplink signal, for each of the terminals 11.

First, the determining unit 27 of the base station 20 selects, out of the terminals 11 performing communication with the base station 20, one of the non-selected terminals 11 as a first terminal 11 (S100). The determining unit 27 then determines on the selected first terminal 11, based on the latest SINR output from the SINR calculation unit 255, whether the SINR is equal to or smaller than a predetermined threshold (S101). If the SINR exceeds the predetermined threshold (No at S101), the determining unit 27 executes the processing at Step S106 which will be described later.

On the other hand, if the SINR is equal to or smaller than the predetermined threshold (Yes at S101), the determining unit 27 outputs the terminal ID of the first terminal 11 to the change unit 28. The change unit 28 refers to the frequency table 290 in the holding unit 29, and identifies the frequencies of the uplink signal and the downlink signal for each of the terminals 11 performing the communication with the base station 20 (S102). The change unit 28 then eliminates, out of the identified frequencies, the frequencies identical to the frequency of the uplink signal or that of the downlink signal of the first terminal 11 (S103).

Next, the change unit 28 identifies any of the remaining frequencies as the frequency to assign to the uplink signal of the first terminal 11. Then, the change unit 28 changes the frequency of the uplink signal of the first terminal 11 to the identified frequency (S104). The change unit 28 then rewrites with the identified frequency the frequency of the uplink signal stored in the frequency table 290 being associated with the terminal ID of the first terminal 11, and thereby updates the frequency table 290 (S105).

Next, the determining unit 27 determines whether all of the terminals 11 performing communication with the base station 20 have been selected (S106). If there is a non-selected terminal 11 (No at S106), the determining unit 27 executes the processing illustrated at Step S100 again. On the other hand, if all of the terminals 11 have been selected (Yes at S106), the base station 20 ends the processing illustrated in the flowchart.

As in the foregoing, according to the base station 20 in the first embodiment, without performing the processing of estimating and eliminating the reflected waves from the received signal, it is possible to change the frequency of the uplink signal to a frequency different from that of the reflected waves. Consequently, the base station 20 in the first embodiment can suppress the self-interference caused by the reflected waves without increasing the circuit scale.

[b] Second Embodiment

Radio Communications System 10

Figure 8:
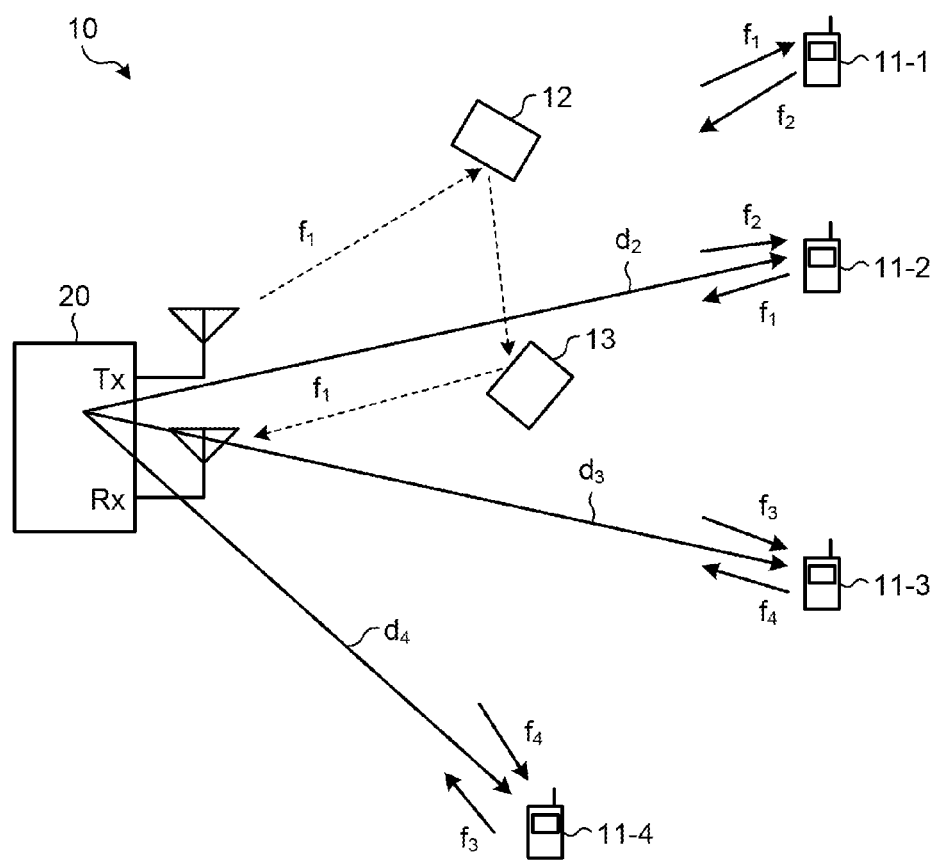
FIG. 8 is a diagram illustrating one example of a radio communications system according to a second embodiment.

FIG. 8 is a diagram illustrating one example of a radio communications system 10 according to a second embodiment. In the radio communications system 10 in the second embodiment, it is different from the first embodiment in that the frequency of an uplink signal for which the reception quality is deteriorated due to reflected waves is replaced with the frequency used by the terminal 11 that is in a direction forming a largest angle with the direction toward the terminal 11 of the transmission source of that uplink signal from the base station 20.

The radio communications system 10 in the second embodiment includes the base station 20 and a plurality of terminals 11 (terminals 11-1 to 11-4). In FIG. 8, the radio communications system 10 that has four pieces of the terminals 11-1 to 11-4 is exemplified. However, the radio communications system 10 may have three or less pieces of the terminals 11, or five or more pieces of the terminals 11.

In the second embodiment, the respective function blocks of the base station 20 are the same, except for the following points explained, as those of the base station 20 in the first embodiment described with reference to FIGS. 2 to 6, and thus the detailed explanations thereof are omitted.

In the second embodiment, as illustrated in FIG. 8, the downlink signal transmitted to the terminal 11-1 from the base station 20 by using the frequency $f_1$ is reflected by the obstacle 12 and the obstacle 13 and arrives at the base station 20 from the direction of the terminal 11-2, for example. Consequently, due to the influence of the reflected waves reflected by the obstacle 12 and the obstacle 13, the reception quality of the uplink signal transmitted from the terminal 11-2 by using the frequency $f_1$ is deteriorated in the base station 20.

The determining unit 27 detects the SINR output from the SINR calculation unit 255 being equal to or smaller than a certain threshold, and thereby detects the deterioration of the reception quality of the uplink signal. The determining unit 27 then outputs, to the change unit 28, the terminal ID of the terminal 11 of the transmission source for which the reception quality has been deteriorated, as the terminal ID of a first terminal 11. In the example in FIG. 8, the determining unit 27 outputs the terminal ID of the terminal 11-2 to the change unit 28.

The change unit 28, when the terminal ID of the first terminal 11 is output from the determining unit 27, refers to the frequency table 290 in the holding unit 29 and identifies the frequencies assigned to the uplink signal or the downlink signal for each of the terminals 11. In the example in FIG. 8, the frequencies $f_1$ to $f_4$ are identified.

Next, the change unit 28 eliminates, out of the identified frequencies, the frequencies of the uplink signal and the downlink signal that are being used by the first terminal 11. In the example in FIG. 8, the terminal 11-2 that is the first terminal 11 is using the frequency $f_1$ for the uplink signal and using the frequency $f_2$ for the downlink signal. Consequently, as for the frequencies identified by the change unit 28, the frequencies $f_3$ and $f_4$ remain.

Next, the change unit 28 refers to the frequency table 290 and identifies, on each of the terminals 11 using the remaining frequencies, the directions toward the respective terminals 11 from the base station 20. In the example in FIG. 8, the terminal 11-3 is using the frequency $f_4$ for the uplink signal and using the frequency $f_3$ for the downlink signal. In the example in FIG. 8, the direction toward the terminal 11-3 from the base station 20 is $d_3$. In the example in FIG. 8, the terminal 11-4 is using the frequency $f_3$ for the uplink signal and using the frequency $f_4$ for the downlink signal. In the example in FIG. 8, the direction toward the terminal 11-4 from the base station 20 is $d_4$.

The change unit 28 then identifies, as a second terminal 11, the terminal 11 that is in the direction forming a largest angle with the direction toward the first terminal 11 from the base station 20. In the example in FIG. 8, the direction toward the terminal 11-2 that is the first terminal 11 from the base station 20 is $d_2$. In the example in FIG. 8, out of the direction $d_3$ of the terminal 11-3 and the direction $d_4$ of the terminal 11-4, the angle of the largest formed with the direction $d_2$ of the first terminal 11 is the direction $d_4$. Thus, the change unit 28 identifies the terminal 11-4 as the second terminal 11.

Then, the change unit 28 instructs the transmitting unit 22 to replace the frequency of the uplink signal or that of the downlink signal of the identified second terminal 11 with the frequency of the uplink signal of the first terminal 11. The transmitting unit 22 generates, in accordance with the instruction from the change unit 28, a downlink signal including a message that specifies replacing of the frequency of the uplink signal or that of the downlink signal of the second terminal 11 with the frequency of the uplink signal of the first terminal 11. The transmitting unit 22 then transmits the generated downlink signal to the first terminal 11 and to the second terminal 11, via the phase adjusting unit 21.

In the example in FIG. 8, the change unit 28 instructs the transmitting unit 22 to replace the frequency $f_3$ of the uplink signal of the terminal 11-4 with the frequency $f_1$ of the uplink signal of the terminal 11-2, for example. Consequently, the frequency of the uplink signal of the terminal 11-2 becomes the frequency $f_3$, and becomes a frequency different from the frequency $f_1$ of the reflected waves. Thus, in the base station 20, it is possible to improve the reception quality of the uplink signal from the terminal 11-2.

In the second embodiment, the base station 20 replaces the frequency of the uplink signal for which the reception quality has been deteriorated due to the reflected waves, with the frequency of the uplink signal or downlink signal being assigned to the other terminal 11. Consequently, it is possible to prevent the usage rate of frequency from being concentrated on a specific frequency and to disperse the usage rate of respective frequencies to a comparable degree.

In the second embodiment, the base station 20 replaces the frequency of the uplink signal for which the reception quality has been deteriorated due to the reflected waves, with the frequency of the uplink signal or downlink signal being used by the second terminal 11 that is in the direction most away from the first terminal 11 that is the transmission source of that uplink signal. Consequently, it is possible to avoid deteriorating the reception quality of the uplink signal from the second terminal 11 due to the reflected waves from the same obstacle, after replacing.

Operation of Base Station 20

Figure 9:
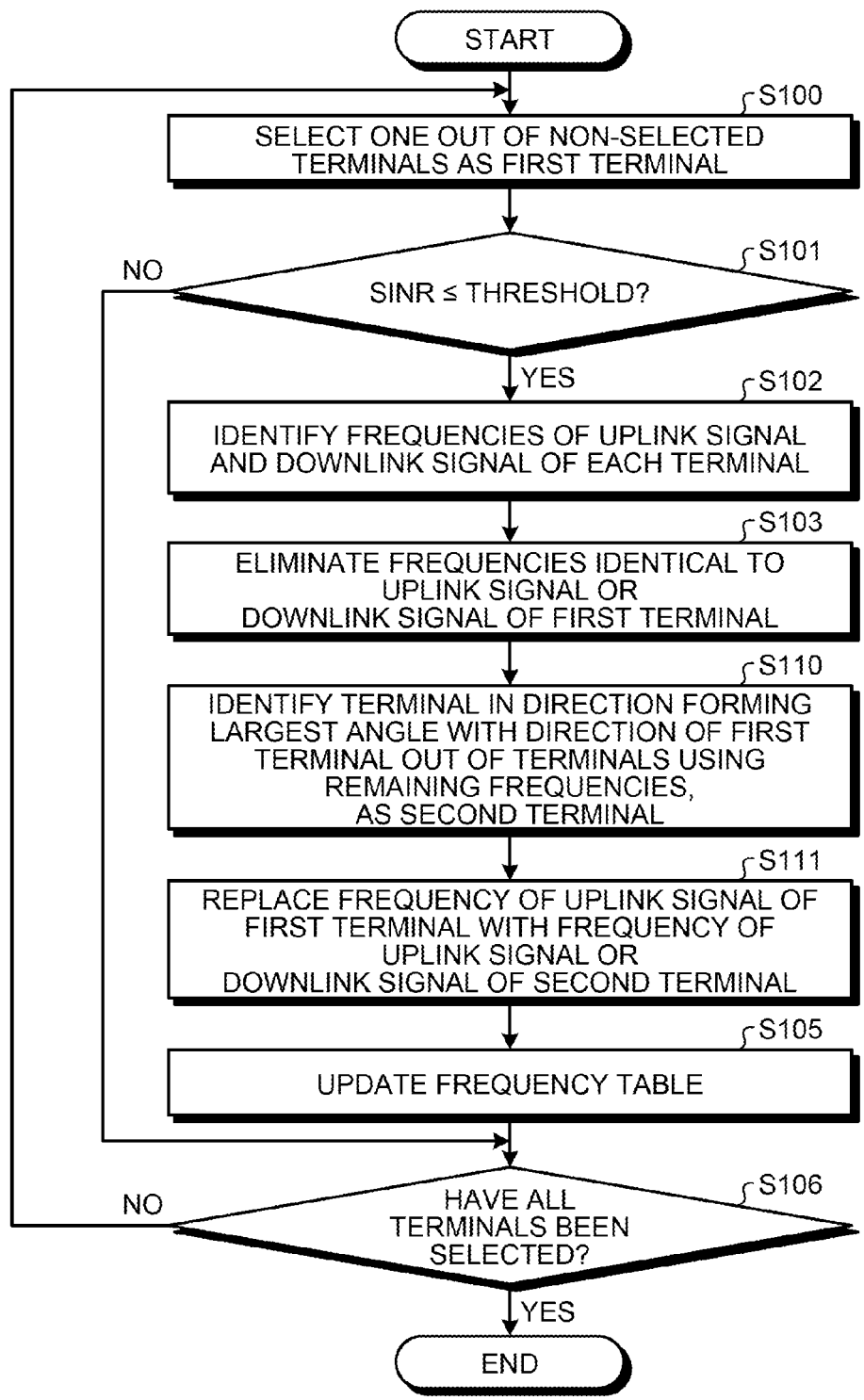
FIG. 9 is a flowchart illustrating one example of the operation of a base station in the second embodiment.

FIG. 9 is a flowchart illustrating one example of the operation of the base station 20 in the second embodiment. Except for the following points explained, in FIG. 9, the processing that is given a reference sign identical to that of FIG. 7 is the same as the processing described with reference to FIG. 7, and thus the detailed explanation thereof is omitted.

At Step S103, after eliminating the frequencies identical to the frequency of the uplink signal or that of the downlink signal of the first terminal 11 out of the identified frequencies, the change unit 28 refers to the frequency table 290 and identifies the direction toward the first terminal 11 from the base station 20. The change unit 28 further refers to the frequency table 290 and identifies, on each of the terminals 11 using the remaining frequencies, the directions toward the respective terminals 11 from the base station 20. The change unit 28 then identifies, out of the terminals 11 using the remaining frequencies, the terminal 11 that is in the direction forming a largest angle with the direction of the first terminal 11, as the second terminal 11 (S110).

Next, the change unit 28 instructs the first terminal 11 and the second terminal 11, and replaces the frequency of the uplink signal of the first terminal 11 with the frequency of the uplink signal or that of the downlink signal of the second terminal 11 (S111). Then, the change unit 28 replaces, in the frequency table 290, the frequency of the uplink signal of the first terminal 11 with the frequency of the uplink signal or that of the downlink signal of the second terminal 11, and thereby updates the frequency table 290 (S105).

[c] Third Embodiment

Radio Communications System 10

Figure 10:
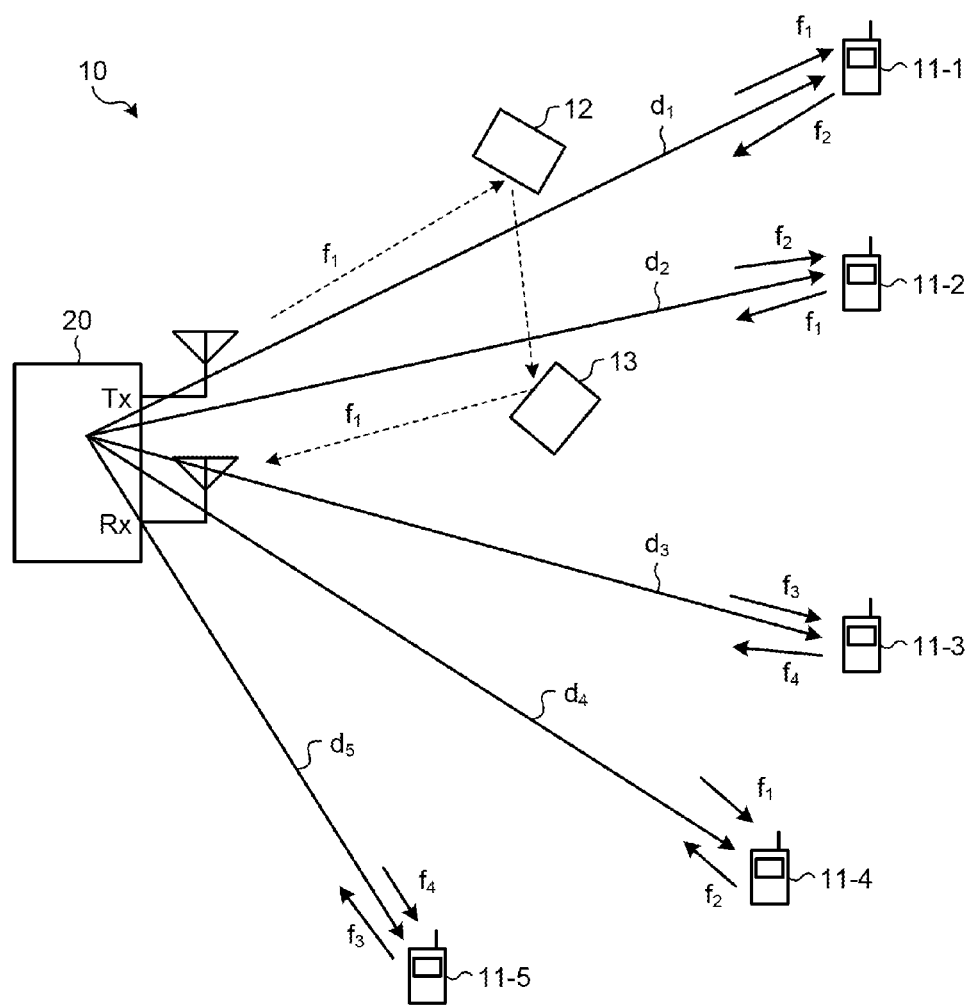
FIG. 10 is a diagram illustrating one example of a radio communications system according to a third embodiment.

FIG. 10 is a diagram illustrating one example of a radio communications system 10 according to a third embodiment. In the radio communications system 10 in the third embodiment, it is different from the first embodiment that, when the reception quality of an uplink signal is deteriorated due to reflected waves, the frequency of a downlink signal addressed to any of the terminals 11 of the frequency identical to that uplink signal is changed.

The radio communications system 10 in the third embodiment includes the base station 20 and a plurality of terminals 11 (terminals 11-1 to 11-5). In FIG. 10, the radio communications system 10 that has five pieces of the terminals 11-1 to 11-5 is exemplified. However, the radio communications system 10 may have four or less pieces of the terminals 11, or six or more pieces of the terminals 11.

In the third embodiment, the respective function blocks of the base station 20 are the same, except for the following points explained, as those of the base station 20 in the first embodiment described with reference to FIGS. 2 to 6, and thus the detailed explanations thereof are omitted.

In the third embodiment, as illustrated in FIG. 10, the downlink signal transmitted to the terminal 11-1 from the base station 20 by using the frequency $f_1$ is reflected by the obstacle 12 and the obstacle 13 and arrives at the base station 20 from the direction of the terminal 11-2, for example. Consequently, due to the influence of the reflected waves reflected by the obstacle 12 and the obstacle 13, the reception quality of the uplink signal transmitted from the terminal 11-2 by using the frequency $f_1$ is deteriorated in the base station 20.

The determining unit 27 detects the SINR output from the SINR calculation unit 255 being equal to or smaller than a certain threshold, and thereby detects the deterioration of the reception quality of the uplink signal. The determining unit 27 then outputs, to the change unit 28, the terminal ID of the terminal 11 of the transmission source for which the reception quality has been deteriorated, as a terminal ID of a first terminal 11. In the example in FIG. 10, the determining unit 27 outputs the terminal ID of the terminal 11-2 to the change unit 28 as the terminal ID of the first terminal 11.

The change unit 28, when the terminal ID of the first terminal 11 is output from the determining unit 27, refers to the frequency table 290 in the holding unit 29 and identifies the terminals 11 that are using the downlink signal of the frequency identical to that of the uplink signal of the first terminal 11. The change unit 28 then refers to the frequency table 290 and, out of the identified terminals 11, identifies the terminal 11 that is in the direction forming a smallest angle with the direction toward the first terminal 11 from the base station 20, as a second terminal 11.

In the example in FIG. 10, the terminals 11 that are using the downlink signal of the frequency $f_1$ identical to that of the uplink signal of the terminal 11-2 are the terminal 11-1 and the terminal 11-4. The angle that is formed between the direction $d_2$ toward the terminal 11-2 from the base station 20 and the direction $d_1$ toward the terminal 11-1 from the base station 20 is smaller than the angle that is formed between the direction $d_2$ toward the terminal 11-2 from the base station 20 and the direction $d_4$ toward the terminal 11-4 from the base station 20. Thus, in the example in FIG. 10, the change unit 28 identifies the terminal 11-1 as the second terminal 11.

Next, the change unit 28 identifies the frequencies that are assigned to the uplink signal or the downlink signal for each of the terminals 11. In the example in FIG. 10, the frequencies $f_1$ to $f_4$ are identified. The change unit 28 then eliminates, from the identified frequencies, the frequencies of the uplink signal and the downlink signal assigned to the second terminal 11. Thus, in the example in FIG. 10, out of the frequencies $f_1$ to $f_4$, the frequency $f_2$ of the uplink signal and the frequency $f_1$ of the downlink signal that are being assigned to the second terminal 11 are eliminated and the frequencies $f_3$ and $f_4$ remain.

Next, the change unit 28 refers to the frequency table 290 and identifies, on each of the terminals 11 using the remaining frequencies, the directions toward the respective terminals 11 from the base station 20. In the example in FIG. 10, the terminals 11 that are using the remaining frequency $f_3$ or $f_4$ are the terminal 11-3 and the terminal 11-5. In the example in FIG. 10, the direction toward the terminal 11-3 from the base station 20 is $d_3$ and the direction toward the terminal 11-5 from the base station 20 is $d_5$.

The change unit 28 then identifies, out of the terminals 11 using the remaining frequencies, the terminal 11 that forms a largest angle with the direction toward the second terminal 11 from the base station 20, as a third terminal 11. The angle that is formed between the direction $d_1$ toward the second terminal 11 from the base station 20 and the direction $d_5$ toward the terminal 11-5 from the base station 20 is larger than the angle that is formed between the direction $d_1$ toward the second terminal 11 from the base station 20 and the direction $d_3$ toward the terminal 11-3 from the base station 20. Thus, in the example in FIG. 10, the change unit 28 identifies the terminal 11-5 as the third terminal 11.

Next, the change unit 28 changes the frequency of the downlink signal of the second terminal 11. For example, the change unit 28 instructs the transmitting unit 22 to replace the frequency of the uplink signal or that of the downlink signal of the identified third terminal 11 with the frequency of the downlink signal of the second terminal 11. The transmitting unit 22 generates, in accordance with the instruction from the change unit 28, a downlink signal including a message that specifies replacing of the frequency of the uplink signal or that of the downlink signal of the third terminal 11 with the frequency of the downlink signal of the second terminal 11. The transmitting unit 22 then transmits the generated downlink signal to the second terminal 11 and to the third terminal 11, via the phase adjusting unit 21.

In the example in FIG. 10, the change unit 28 instructs the transmitting unit 22 to replace the frequency $f_4$ of the downlink signal of the terminal 11-5 with the frequency $f_1$ of the downlink signal of the terminal 11-1, for example. Consequently, the frequency of the downlink signal of the terminal 11-1 becomes the frequency $f_4$, and thus the frequency of the reflected waves becomes a frequency different from the frequency $f_1$ of the uplink signal from the terminal 11-2. Thus, in the base station 20, it is possible to improve the reception quality of the uplink signal from the terminal 11-2.

In the third embodiment, the base station 20 replaces the frequency that is identical to the frequency of the uplink signal for which the reception quality has been deteriorated and is the frequency of an downlink signal in the direction closest to the direction of that uplink signal, with the frequency used by the third terminal 11 that is in the direction most away from the direction of that downlink signal. Thus, by the replacement of frequencies, it is possible to improve the quality of the uplink signal of the first terminal 11 more reliably.

Operation of Base Station 20

FIG. 11 is a flowchart illustrating one example of the operation of the base station 20 in the third embodiment. Except for the following points explained, in FIG. 11, the processing that is given a reference sign identical to that of FIG. 7 is the same as the processing described with reference to FIG. 7, and thus the detailed explanation thereof is omitted.

If the SINR is equal to or smaller than a predetermined threshold (Yes at S101), the determining unit 27 outputs the terminal ID of the first terminal 11 to the change unit 28. The change unit 28 identifies the terminals 11 that are using the downlink signal of the frequency $f_1$ identical to that of the uplink signal of the first terminal 11. The change unit 28 then refers to the frequency table 290 and identifies, out of the identified terminals 11, the terminal 11 that is in the direction forming a smallest angle with the direction toward the first terminal 11 from the base station 20, as the second terminal 11 (S120).

Next, the change unit 28 refers to the frequency table 290, and identifies the frequencies of the uplink signal and the downlink signal for each of the terminals 11 performing the communication with the base station 20 (S121). Then, the change unit 28 eliminates, out of the identified frequencies, the frequencies identical to the frequency of the uplink signal or that of the downlink signal of the second terminal 11 (S122).

Next, the change unit 28 refers to the frequency table 290 and identifies the direction toward the second terminal 11 from the base station 20. The change unit 28 further refers to the frequency table 290 and identifies, on each of the terminals 11 using the remaining frequencies, the directions toward the respective terminals 11 from the base station 20. The change unit 28 then identifies, out of the terminals 11 using the remaining frequencies, the terminal 11 that is in the direction forming a largest angle with the direction toward the second terminal 11 from the base station 20, as the third terminal 11 (S123).

Next, the change unit 28 instructs the second terminal 11 and the third terminal 11, and replaces the frequency of the downlink signal of the second terminal 11 with the frequency of the uplink signal or that of the downlink signal of the third terminal 11 (S124). Then, the change unit 28 replaces, in the frequency table 290, the frequency of the downlink signal of the second terminal 11 with the frequency of the uplink signal or that of the downlink signal of the third terminal 11, and thereby updates the frequency table 290 (S105).

Hardware

FIG. 12 is a block diagram illustrating one example of the hardware of the base station 20. The base station 20 includes the transmitting antenna 40, the receiving antenna 50, a network interface 200, a memory 201, a processor 202, and a radio communication module 203.

The transmitting unit 22, the direct-wave cancellation unit 24, the receiving unit 25, the phase controller 26, the determining unit 27, the change unit 28, and the data processor 30 are implemented with the processor 202 such as a central processing unit (CPU) and a digital signal processor (DSP). The phase adjusting unit 21 and the phase adjusting unit 23 are implemented with the processor 202 and the radio communication module 203. The holding unit 29 is implemented with the memory 201 such as a random access memory (RAM), a read only memory (ROM), and a flash memory.

In the memory 201, a processing program is stored. The processor 202 reads out and executes the processing program from the memory 201, and thereby implements the respective functions of the transmitting unit 22, the direct-wave cancellation unit 24, the receiving unit 25, the phase controller 26, the determining unit 27, the change unit 28, and the data processor 30.

The processing program in the memory 201 does not necessarily need to be stored all in the memory 201 from the beginning. For example, it may be configured such that the program is stored in a portable recording medium such as a memory card that is inserted to the base station 20 so that the base station 20 acquires and executes a portion of the processing program that is used for the processing from such a portable recording medium. It may be configured such that the base station 20 acquires and executes the processing program from the other computer, a server, or others, in which the processing program is stored, via a radio communication line, a public line, the Internet, a LAN, a WAN, and others.

Others

In the respective embodiments in the foregoing, the radio communications system 10 including the base station 20 and a plurality of terminals 11 has been exemplified. The disclosed technology, however, is not limited to this and, as long as it is a communication apparatus capable of full duplex communication, the disclosed technology can be applied.

In the second or the third embodiment in the foregoing, when the frequency of the uplink signal or the downlink signal is replaced between two terminals 11, the frequency of the uplink signal and that of the downlink signal may become identical on either of the terminals 11. In that case, the base station 20 may replace, on the two terminals 11 with which frequencies are replaced, the frequencies between the uplink signals and the frequencies between the downlink signals.

In the first and the second embodiments in the foregoing, the base station 20 changes the frequency of the uplink signal, for which the reception quality has been deteriorated due to the reflected waves, to the frequency being used by the terminal 11 that is different from the terminal 11 of the transmission source of that uplink signal. The disclosed technology, however, is not limited to this. For example, when the reception quality of the uplink signal is deteriorated due to reflected waves, and when the frequency of the downlink signal used by the terminal 11 of the transmission source of that uplink signal is different from the frequency of that uplink signal, the base station 20 may make that terminal 11 replace the frequency of the uplink signal with that of the downlink signal.

According to one embodiment, it is possible to suppress the self-interference caused by the reflected waves without increasing the circuit scale.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station capable of simultaneously receiving an uplink signal from a terminal and transmitting a downlink signal to a terminal by using an identical frequency, the base station comprising:
   a transmitting unit that transmits, for each terminal, a downlink signal at a frequency assigned to the terminal via an antenna having directivity in a direction of the terminal;
   a receiving unit that receives, for each terminal, an uplink signal at a frequency assigned to the terminal via an antenna having directivity in a direction of the terminal;
   a determining unit that determines, for each terminal, whether reception quality of the uplink signal from the terminal, due to reflected waves of a downlink signal, is equal to or smaller than a certain threshold; and
   a change unit that, when the determining unit determines that the reception quality is equal to or smaller than the certain threshold, instructs a first terminal that is a terminal of a transmission source of an uplink signal to change the frequency of the uplink signal of the first terminal to either the frequency of an uplink signal or the frequency of a downlink signal assigned to each terminal, or changes the frequency of a downlink signal identical to the frequency of the uplink signal from the first terminal to either the frequency of an uplink signal or the frequency of a downlink signal assigned to each terminal.

2. The base station according to claim 1, further comprising:
   a holding unit that holds, for each terminal, the frequency of the uplink signal and the frequency of the downlink signal, wherein
   the change unit instructs the first terminal to change the frequency to a frequency different from the frequency of the downlink signal for the first terminal when instructing the first terminal to change the frequency of the uplink signal.

3. The base station according to claim 1, wherein the change unit instructs both the first terminal and a second terminal, the second terminal that transmits an uplink signal of a frequency different from the frequency of the uplink signal of the first terminal, to replace the frequency of the uplink signal between the first terminal and the second terminal when instructing the first terminal to change the frequency of the uplink signal.

4. The base station according to claim 3, wherein
the holding unit further holds, for each terminal, information indicating a direction toward the terminal from the base station,
the second terminal is one of a plurality of the second terminals, and
the change unit selects, out of the second terminals, the second terminal by which a largest angle is formed between the direction toward the first terminal from the base station and the direction toward the second terminal from the base station, and instructs both the first terminal and the selected second terminal to replace the frequency of the uplink signal with the selected second terminal when instructing the first terminal to change the frequency of the uplink signal.

5. The base station according to claim 1, further comprising:
a holding unit that holds, for each terminal, the frequency of the uplink signal, the frequency of the downlink signal, and information indicating a direction toward the terminal from the base station, wherein
the change unit selects, out of second terminals that receive the downlink signal of a frequency identical to the uplink signal from the first terminal, the second terminal by which a smallest angle is formed between the direction toward the first terminal from the base station and the direction toward the second terminal from the base station and changes the frequency of the downlink signal received by the selected second terminal when changing the frequency of the downlink signal of the frequency identical to the uplink signal from the first terminal.

6. The base station according to claim 5, wherein the change unit changes the frequency of the downlink signal received by the selected second terminal to a frequency different from the frequency of the uplink signal from the selected second terminal.

7. The base station according to claim 5, wherein the change unit replaces the frequency of the downlink signal between the selected second terminal and a third terminal that receives the downlink signal of a frequency different from the frequency of the downlink signal received by the selected second terminal.

8. The base station according to claim 7, wherein the change unit further replaces the frequency of uplink signal between the selected second terminal and the third terminal when the frequency of the uplink signal and the frequency of the downlink signal are identical in the selected second terminal or the third terminal by replacing the frequency of the downlink signal between the selected second terminal and the third terminal.

9. The base station according to claim 7, wherein
the third terminal is one of a plurality of the third terminals, and
the change unit selects, out of the third terminals, the third terminal by which a largest angle is formed between the direction toward the selected second terminal from the base station and the direction toward the third terminal from the base station, and replaces the frequency of the downlink signal between the selected third terminal and the selected second terminal.

10. The base station according to claim 1, wherein the determining unit determines, for each terminal, that the reception quality of the uplink signal from the terminal, due to the reflected waves of the downlink signal, is equal to or smaller than the certain threshold when a signal-to-interference plus noise power ratio (SINR) of the uplink signal from the terminal is equal to or smaller than a certain value.

11. The base station according to claim 10, wherein the determining unit calculates, for each terminal, the SINR of the uplink signal for each of a certain number of slots in the uplink signal.

12. A radio communications system comprising:
a plurality of terminals; and
a base station capable of simultaneously receiving an uplink signal from each of the terminals and transmitting a downlink signal to each of the terminals by using an identical frequency, wherein
the base station comprises:
a transmitting unit that transmits, for each of the terminals, a downlink signal at a frequency assigned to the terminal via an antenna having directivity in a direction of the terminal;
a receiving unit that receives, for each of the terminals, an uplink signal at a frequency assigned to the terminal via an antenna having directivity in a direction of the terminal;
a determining unit that determines, for each of the terminals, whether reception quality of the uplink signal from the terminal, due to reflected waves of a downlink signal, is equal to or smaller than a certain threshold; and
a change unit that, when the determining unit determines that the reception quality is equal to or smaller than the certain threshold, instructs a first terminal that is a terminal of a transmission source of an uplink signal to change the frequency of the uplink signal of the first terminal to either the frequency of an uplink signal or the frequency of a downlink signal assigned to each of the terminals, or changes the frequency of a downlink signal identical to the frequency of the uplink signal from the first terminal to either the frequency of an uplink signal or the frequency of a downlink signal assigned to each of the terminals.

13. A processing method in a base station capable of simultaneously receiving an uplink signal from a terminal and transmitting a downlink signal to a terminal by using an identical frequency, the processing method comprising:
transmitting, for each terminal, a downlink signal at a frequency assigned to the terminal via an antenna having directivity in a direction of the terminal;
receiving, for each terminal, an uplink signal at a frequency assigned to the terminal via an antenna having directivity in a direction of the terminal;
determining, for each terminal, whether reception quality of the uplink signal from the terminal, due to reflected waves of a downlink signal, is equal to or smaller than a certain threshold; and
instructing a first terminal that is a terminal of a transmission source of an uplink signal to change the frequency of the uplink signal of the first terminal to either the frequency of an uplink signal or the frequency of a downlink signal assigned to each terminal or changing the frequency of a downlink signal identical to the frequency of the uplink signal from the first terminal to either the frequency of an uplink signal or the frequency of a downlink signal assigned to each terminal when it is determined that the reception quality is equal to or smaller than the certain threshold.

* * * * *